(12) United States Patent
Paller et al.

(10) Patent No.: US 9,541,303 B2
(45) Date of Patent: Jan. 10, 2017

(54) ALTERNATIVE-FUEL GAS ORIFICE HAVING PRINCIPAL-FUEL GAS ORIFICE TEMPERATURE PROFILE AND A HEATING, VENTILATION AND AIR CONDITIONING SYSTEM INCORPORATING THE SAME

(75) Inventors: Hans J. Paller, Double Oak, TX (US); Glenn W. Kowald, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 1164 days.

(21) Appl. No.: 12/834,658

(22) Filed: Jul. 12, 2010

(65) Prior Publication Data

US 2011/0177465 A1 Jul. 21, 2011

Related U.S. Application Data

(60) Provisional application No. 61/295,501, filed on Jan. 15, 2010.

(51) Int. Cl.
| | |
|---|---|
| F23D 14/46 | (2006.01) |
| F24C 3/10 | (2006.01) |
| B21D 53/00 | (2006.01) |
| F24H 3/08 | (2006.01) |
| F23D 14/58 | (2006.01) |
| F23D 14/34 | (2006.01) |

(Continued)

(52) U.S. Cl.
CPC ............. *F24H 3/087* (2013.01); *B29C 45/18* (2013.01); *F23D 14/34* (2013.01); *F23D 14/58* (2013.01); *F24H 8/006* (2013.01); *F25D 21/14* (2013.01); *B29L 2031/18* (2013.01); *F23D 2900/14481* (2013.01); *Y02B 30/106* (2013.01); *Y10T 29/49* (2015.01); *Y10T 29/4935* (2015.01); *Y10T 29/49348* (2015.01); *Y10T 29/49389* (2015.01); *Y10T 29/49826* (2015.01); *Y10T 137/4463* (2015.04)

(58) Field of Classification Search
CPC .......... F24H 3/087; F24H 8/006; F23D 14/34; F23D 14/58; F23D 2900/14481
USPC ............................. 431/193, 350; 29/890.02
See application file for complete search history.

(56) References Cited

U.S. PATENT DOCUMENTS

| | | | | |
|---|---|---|---|---|
| 2,079,807 | A | * | 5/1937 | Kehl ................................ 55/486 |
| 2,631,659 | A | * | 3/1953 | Wright ........................ 48/180.1 |

(Continued)

FOREIGN PATENT DOCUMENTS

| | | |
|---|---|---|
| CN | 1729371 A | 2/2006 |
| CN | 1849495 A | 10/2006 |

(Continued)

OTHER PUBLICATIONS

U.S. Appl. No. 15/091,956, Kowald et al.

*Primary Examiner* — William G Corboy
(74) *Attorney, Agent, or Firm* — Winstead PC

(57) ABSTRACT

An alternative-fuel gas orifice, a gas furnace configured to employ the same and a method of designing a gas orifice. In one embodiment, the gas orifice includes: (1) a body having an aperture extending therethrough and including: (1a) a metering neck having a cross-sectional area such that a given flow rate of a gas is established when the gas is delivered to the gas orifice at a given alternative-fuel delivery pressure and (1b) a diffuser having a cross-sectional area larger than the cross-sectional area of the metering neck and a length such that the gas achieves a substantially laminar flow before exiting the diffuser.

6 Claims, 4 Drawing Sheets

(51) Int. Cl.
  *F24H 8/00* (2006.01)
  *B29C 45/18* (2006.01)
  *F25D 21/14* (2006.01)
  *B29L 31/18* (2006.01)

(56) References Cited

U.S. PATENT DOCUMENTS

| | | | |
|---|---|---|---|
| 3,274,990 A * | 9/1966 | MacCracken | 126/110 R |
| 3,806,038 A * | 4/1974 | Nelson | 239/407 |
| 4,309,947 A | 1/1982 | Ketterer | |
| 4,309,977 A | 1/1982 | Kitchen | |
| 4,481,935 A | 11/1984 | Bawel | |
| 4,603,680 A | 8/1986 | Dempsey et al. | |
| 4,622,947 A | 11/1986 | Hays et al. | |
| 5,123,452 A * | 6/1992 | LeBlanc | 138/44 |
| 5,186,386 A | 2/1993 | Lynch | |
| 5,313,930 A | 5/1994 | Kujawa et al. | |
| 5,320,087 A | 6/1994 | Froman | |
| 5,322,050 A | 6/1994 | Lu | |
| 5,347,980 A | 9/1994 | Shellenberger | |
| 5,375,586 A | 12/1994 | Schumacher et al. | |
| 5,429,150 A * | 7/1995 | Siefers, Jr. | 137/177 |
| 5,448,986 A | 9/1995 | Christopher et al. | |
| 5,582,159 A | 12/1996 | Harvey et al. | |
| 5,623,918 A | 4/1997 | Swilik, Jr. et al. | |
| 5,642,660 A * | 7/1997 | Killgore | A47J 37/1242 |
| | | | 126/391.1 |
| 5,704,343 A | 1/1998 | Ahn et al. | |
| 5,749,355 A | 5/1998 | Roan et al. | |
| 5,775,318 A | 7/1998 | Haydock et al. | |
| 5,799,646 A | 9/1998 | Zia et al. | |
| 6,237,545 B1 | 5/2001 | Barnett et al. | |
| 6,893,252 B2 * | 5/2005 | Stephens et al. | 431/9 |
| 7,036,498 B2 | 5/2006 | Riepenhoff et al. | |
| 8,056,533 B2 | 11/2011 | Wagner | |
| 8,056,553 B2 | 11/2011 | Khan | |
| 8,393,318 B2 | 3/2013 | Khan et al. | |
| 8,474,281 B2 | 7/2013 | Kumar | |
| 8,561,601 B2 | 10/2013 | Schneberger et al. | |
| 8,672,673 B2 | 3/2014 | Noman et al. | |
| 8,683,993 B2 | 4/2014 | Paller et al. | |
| 2003/0188733 A1 | 10/2003 | Woodall et al. | |
| 2005/0126558 A1 | 6/2005 | Riepenhoff et al. | |
| 2007/0003891 A1 | 1/2007 | Jaeschke | |
| 2008/0314375 A1 | 12/2008 | Khan | |
| 2009/0044793 A1 | 2/2009 | Khan et al. | |
| 2009/0044794 A1 | 2/2009 | Hugghins et al. | |
| 2011/0070818 A1 | 3/2011 | Goel et al. | |
| 2011/0174201 A1 | 7/2011 | Kowald et al. | |
| 2011/0174291 A1 | 7/2011 | Manohar et al. | |
| 2011/0174461 A1 | 7/2011 | Kowald et al. | |
| 2011/0174471 A1 | 7/2011 | Paller et al. | |
| 2011/0174891 A1 | 7/2011 | Kowald et al. | |
| 2012/0055465 A1 | 3/2012 | Khan | |
| 2012/0090591 A1 | 4/2012 | Rieke et al. | |
| 2016/0223198 A1 | 8/2016 | Kowald et al. | |

FOREIGN PATENT DOCUMENTS

| | | | |
|---|---|---|---|
| CN | 1930441 A | 3/2007 | |
| CN | 201203263 Y | 3/2009 | |
| EP | 0596555 A1 | 5/1994 | |
| FR | 1147639 A * | 11/1957 | F23D 14/48 |
| FR | 2581735 A1 | 11/1986 | |
| JP | S5620908 A | 2/1981 | |
| JP | 2007253206 A | 10/2007 | |

* cited by examiner

ALTERNATIVE-FUEL GAS ORIFICE HAVING PRINCIPAL-FUEL GAS ORIFICE TEMPERATURE PROFILE AND A HEATING, VENTILATION AND AIR CONDITIONING SYSTEM INCORPORATING THE SAME

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System," and incorporated herein by reference.

TECHNICAL FIELD

This application is directed, in general, to heating, ventilation and air conditioning (HVAC) systems and, more specifically, to an alternative-fuel gas orifice having a principal-fuel gas orifice temperature profile and an HVAC system incorporating the same.

BACKGROUND

Most modern HVAC systems are employed at sites at which commercial natural gas service is available. As a result, most gas furnaces are designed to use natural gas as their principal fuel. A typical gas furnace employs a controlled solenoid valve to turn the gas on and off as heating needs require; one or more gas orifices to introduce the gas into the furnace in a controlled manner; and one or more heat exchangers to receive the gas, allow air to become entrained and mix with it, contain a combustion of the gas-air mixture and allow heat resulting from the combustion to be transferred to the environment surrounding the heat exchanger.

Though most gas furnaces are designed to use natural gas as their principal fuel, many are also capable of using an alternative fuel, such as gaseous propane. (Propane is typically stored as a liquid in a tank, and propane gas is extracted from the tank to fuel propane-fueled appliances such as furnaces.) This makes such furnaces employable at sites where commercial natural gas service is not available and therefore increases their utility. It is understood, however, that the heat exchangers of furnaces designed to use natural gas have a shorter life expectancy when propane is used instead.

SUMMARY

One aspect provides an alternative-fuel gas orifice. In one embodiment, the gas orifice includes: (1) a body having an aperture extending therethrough and including: (1a) a metering neck having a cross-sectional area such that a given flow rate of a gas is established when the gas is delivered to the gas orifice at a given alternative-fuel delivery pressure and (1b) a diffuser having a cross-sectional area larger than the cross-sectional area of the metering neck and a length such that the gas achieves a substantially laminar flow before exiting the diffuser.

Another aspect provides a gas furnace. In one embodiment, the furnace includes: (1) a housing, (2) a solenoid valve located in the housing, (3) a manifold coupled to the valve, (4) at least one gas orifice coupled to the manifold, the at least one gas orifice having a body with an aperture extending therethrough and including: (4a) a metering neck having a cross-sectional area such that a given flow rate of a gas is established when the gas is delivered to the gas orifice at a given alternative-fuel delivery pressure and (4b) a diffuser having a cross-sectional area larger than the cross-sectional area of the metering neck and a length such that the gas achieves a substantially laminar flow before exiting the diffuser, (5) at least one corresponding heat exchanger located proximate the at least one gas orifice and (6) a blower located in the housing proximate the at least one heat exchanger.

Yet another aspect provides a method of designing a gas orifice. In one embodiment, the method includes: (1) determining a temperature profile assuming a principal fuel delivered to a principal-fuel gas orifice having a metering neck of a desired cross sectional area at a standard delivery pressure for the principal fuel, (2) determining a cross-sectional area of a metering neck for an alternative-fuel gas orifice assuming a standard delivery pressure for the alternative fuel, (3) determining a cross-sectional area and a length of a diffuser based on the temperature profile that results from the alternative fuel delivered to the orifice at a standard delivery pressure for the alternative fuel and (4) manufacturing at least one alternative-fuel gas orifice having a metering neck of the desired cross-sectional area and diffuser of the desired cross-sectional area and length.

BRIEF DESCRIPTION

Reference is now made to the following descriptions taken in conjunction with the accompanying drawings, in which.

Figure 3A:
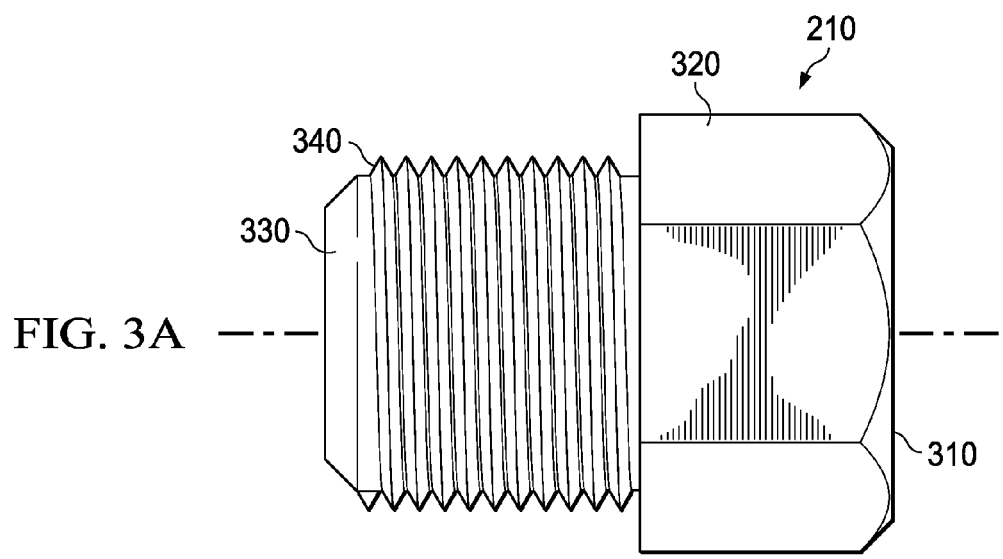
Figure 3B:
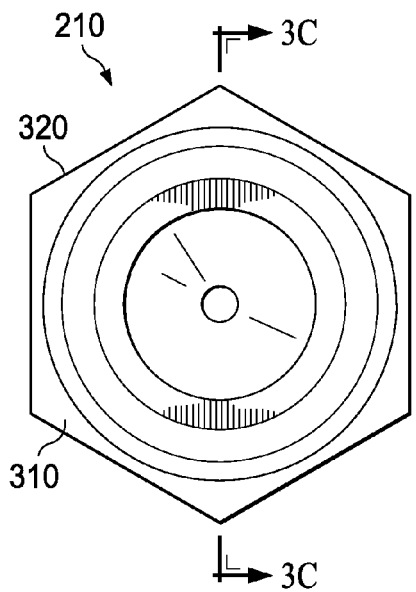
Figure 3C:
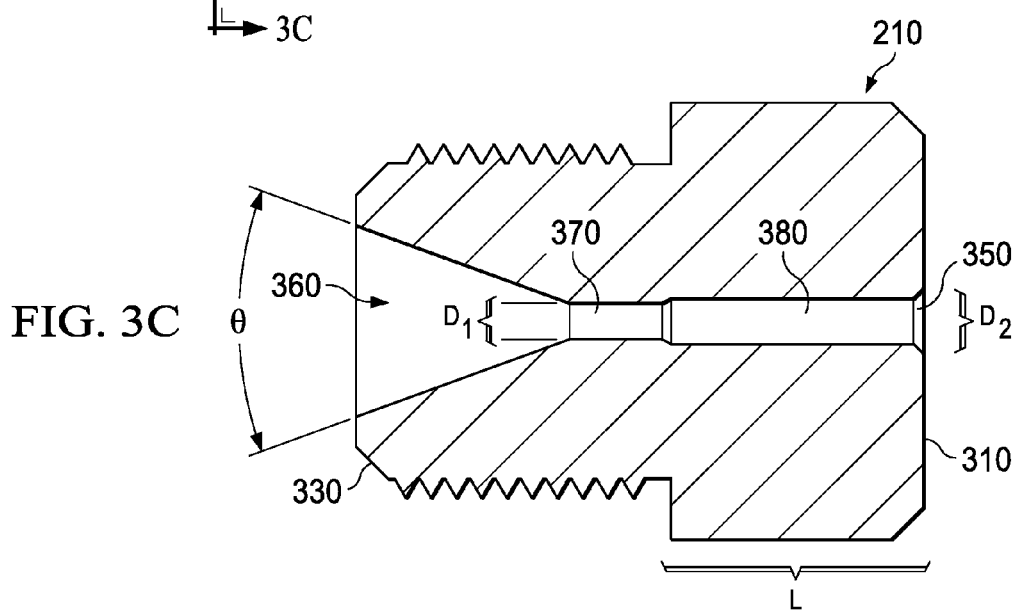
Figure 4:
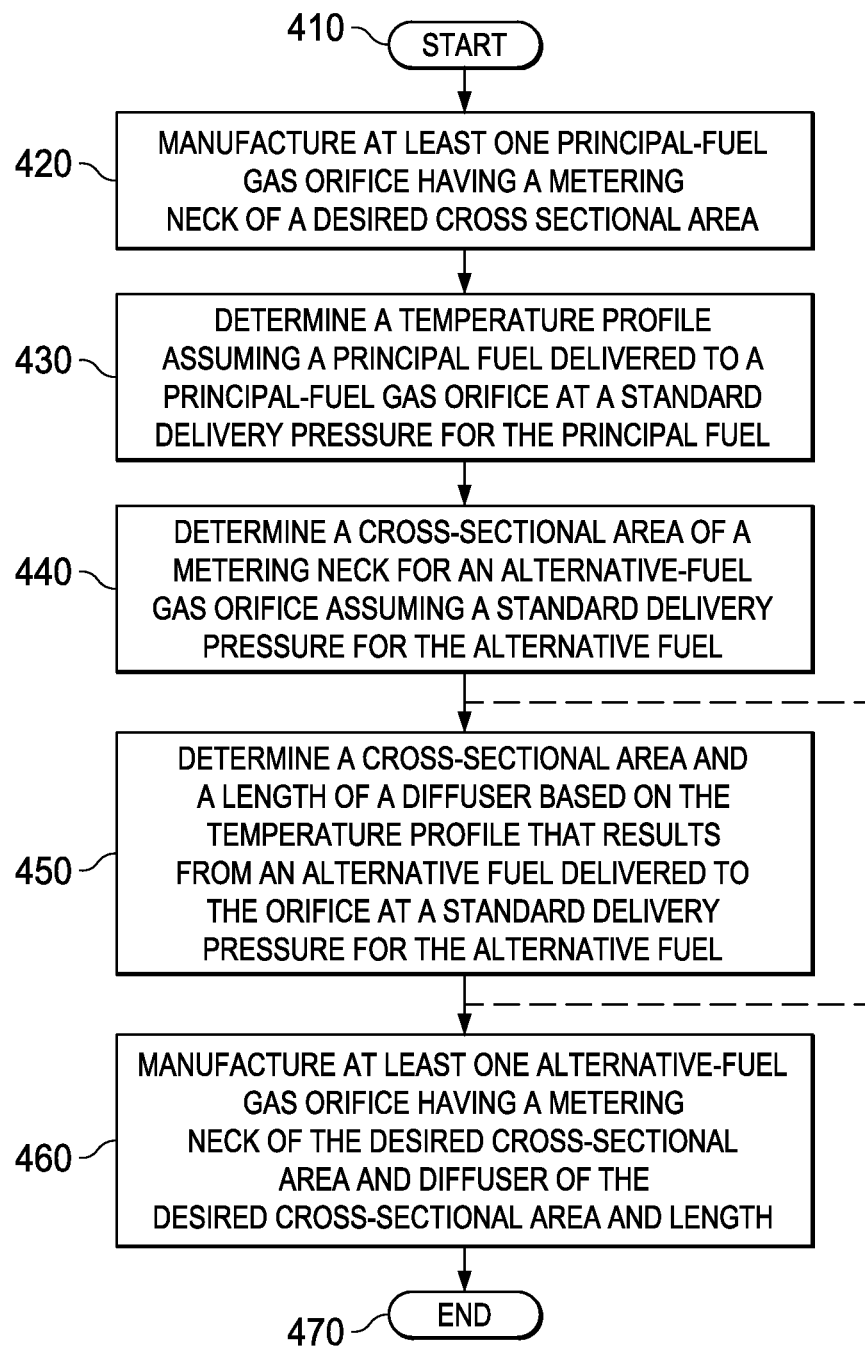

FIGS. 3A-C are respective side, right-end and cross-section elevational views of one embodiment of a gas orifice constructed according to the principles of the invention; and FIG. 4 is a flow diagram of one embodiment of a method of designing a gas orifice carried out according to the principles of the invention.

DETAILED DESCRIPTION

The burning of gas in a given heat exchanger produces various temperatures in different regions of the heat exchanger. Taken together, these various temperatures form a "temperature profile" that the heat exchanger should be designed to accommodate. As stated above, a heat exchanger designed for a gas that is most likely to be used (a "principal fuel") typically experiences a shorter life expectancy when another gas (an "alternative fuel") is used instead. It has been discovered that the different temperature profile that results from the use of the alternative fuel causes stresses in the heat exchanger that ultimately reduce its life expectancy.

One obvious solution would be to make the heat exchanger readily interchangeable, such that a heat exchanger appropriate to the fuel to be used can be installed in a given furnace. Unfortunately, heat exchangers are relatively large and complex and located relatively deep in the furnace; replacing a heat exchanger can be difficult and expensive. Another obvious solution would be to design a single heat exchanger that can accommodate the temperature profiles produced by either the principal and alternative fuels. Unfortunately, heat transfer efficiency would be compromised for both fuels. Further, the resulting heat exchanger would increase the cost of the furnace for every end-user, and needlessly so for the vast majority of end-users who would use only the principal fuel for their furnaces.

Introduced herein is a furnace that takes a distinctly nonobvious approach to the challenge of accommodating multiple fuels. Described herein are various embodiments of a furnace in which its one or more gas orifices are interchangeable to accommodate different gaseous fuel types. The furnace's heat exchanger is designed to accommodate the temperature profile produced by the one or more (e.g., conventional) principal-fuel gas orifices configured to receive a principal fuel at a standard delivery pressure for that principal fuel. For sites at which the principal fuel is either unavailable or undesired, one or more alternative-fuel gas orifices may then be installed in lieu of the one or more principal-fuel gas orifices. The one or more alternative-fuel gas orifices are configured to produce substantially the same temperature profile as the one or more principal fuel gas orifices but instead use an alternative fuel at a standard delivery pressure for that alternative fuel. In this manner, the heat exchanger design can remain optimal for both the principal and alternative fuels. Further, the same heat exchanger design can be used for both fuels without having to be reinforced to handle substantially different temperature profiles. In certain embodiments, the principal fuel is natural gas, and the alternative fuel is propane.

In various embodiments, the gas orifice accommodates a different (e.g., higher) standard delivery pressure of the alternative fuel such that the alternative fuel does not have to be delivered at a nonstandard pressure. In other words, an end-user does not have to modify his alternative fuel system to provide a nonstandard pressure. In various embodiments, the standard delivery pressure of natural gas is less than the standard delivery pressure of propane, therefore in various embodiments, the gas orifice accommodates the higher standard propane delivery pressure.

Figure 1:
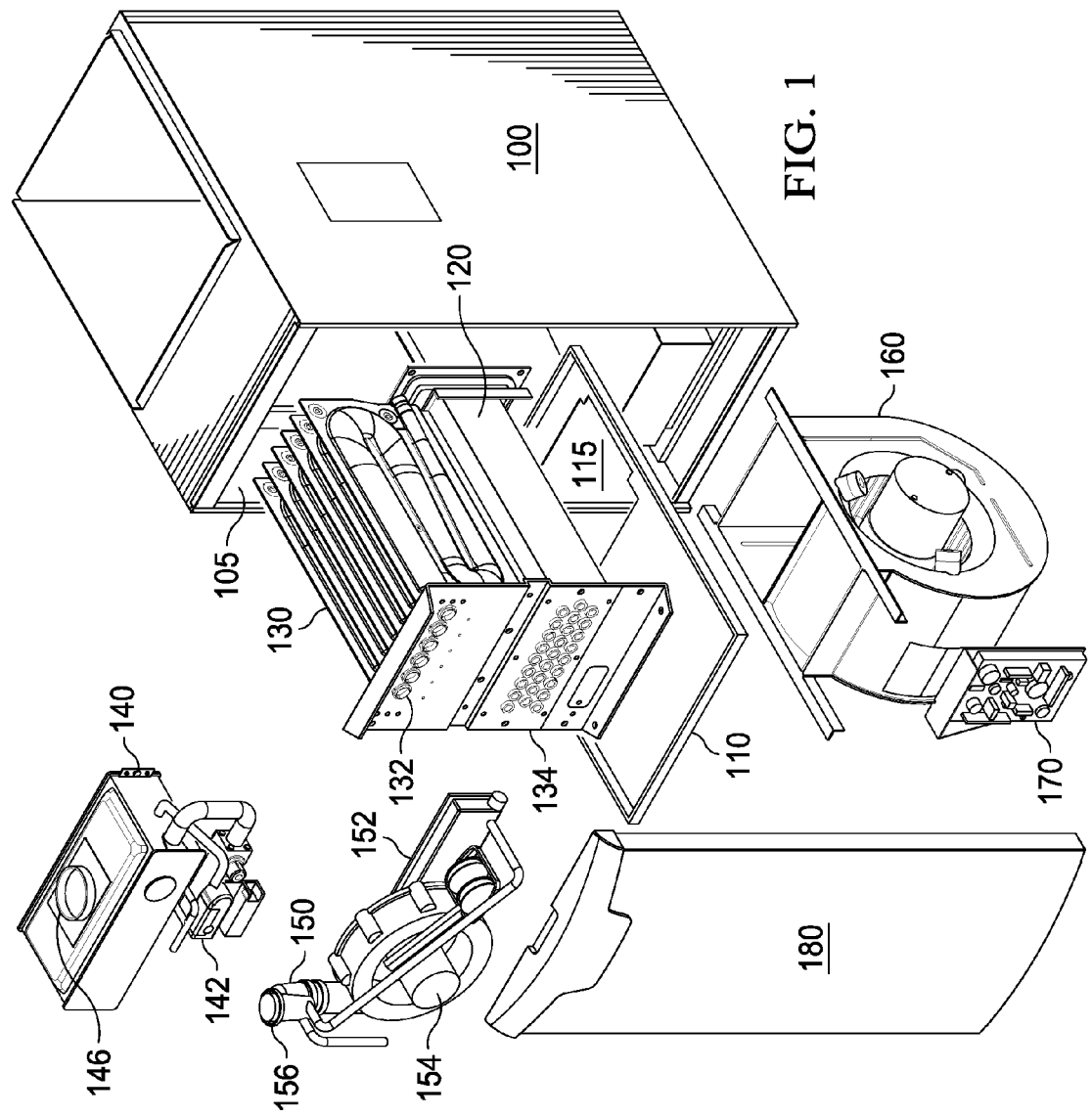
FIG. 1 is an exploded isometric view of a portion of one embodiment of a furnace within which a gas orifice constructed according to the principles of the invention may be employed.

Turning now to FIG. 1, illustrated is an exploded isometric view of a portion of one embodiment of a furnace within which a gas orifice constructed according to the principles of the invention may be employed. The furnace includes a housing 100 having a front opening 105 within which a mounting shelf 110 is located. The mounting shelf 110 has an opening 115 therein and supports a heat exchanger assembly 120 over the opening 115. The illustrated embodiment of the heat exchanger assembly 120 has a row of six heat exchangers (one referenced as 130) coupled to one another. Alternative embodiments of the heat exchanger assembly 120 have more or fewer heat exchangers coupled to one another in one or more rows. In the illustrated embodiment, the heat exchangers are generally serpentine and have three approximately 180° folds such that the heat exchangers cross over the opening 115 four times, terminating in inlets 132 and outlets 134 that are generally mutually coplanar and oriented toward the opening 105 of the housing 100. Alternative embodiments have alternative heat exchanger configurations.

A burner assembly 140 contains a thermostatically-controlled solenoid valve 142, a manifold 144 leading from the valve 142 and across the burner assembly 150 and one or more gas orifices (not shown) coupled to the manifold 144. The illustrated embodiment of the burner assembly 140 has a row of six gas orifices. Alternative embodiments of the burner assembly 140 have more or fewer gas orifices arranged in one or more rows. A flue 146 allows undesired gases (e.g., unburned fuel) to be vented from the burner assembly 140. In an assembled configuration, the burner assembly 140 is located proximate the heat exchanger assembly 120 such that the gas orifices at least approximately align with the inlets 132.

A draft inducer assembly 150 contains a manifold 152, a draft inducing exhaust fan 154 having an inlet coupled to the manifold 152 and a flue 156 coupled to an outlet of the exhaust fan 154. In an assembled configuration, the draft inducer assembly 150 is located proximate the heat exchanger assembly 120 such that the manifold 152 thereof at least approximately align with the outlets 134 and the flue 156 at least approximately aligns with the flue 146 of the burner assembly 140.

A blower 160 is suspended from the shelf 110 such that an outlet (not referenced) thereof approximately aligns with the opening 115. An electronic controller 170 is located proximate the blower 160 and, in the illustrated embodiment, controls the blower, the valve 142 and the exhaust fan 154 to cause the furnace to provide heat. A cover 180 may be placed over the front opening 105 of the housing 100.

In the illustrated embodiment, the controller 170 turns on the exhaust fan to initiate a draft in the heat exchangers (including the heat exchanger 130) and purge potentially harmful unburned or combustion gases. Then the controller 170 opens the valve 142 to admit gas to the manifold 144 and the one or more gas orifices, whereupon the gas begins to mix with air to form primary combustion air. Then the controller 170 activates an igniter (not shown in FIG. 1) to attempt to ignite the primary combustion air. If the output of a thermocouple indicates that the primary combustion air has not ignited within a predetermined period of time, the controller 170 then closes the valve 142 and waits until attempting to start again. If the output of a thermocouple indicates that the primary combustion air has ignited within the predetermined period of time, the controller 170 then activates the blower, which forces air upward through the opening 115 and the heat exchanger assembly 120. As it passes over the surfaces of the heat exchangers, the air is warmed, whereupon it may be delivered or distributed as needed to provide heating.

Figure 2:
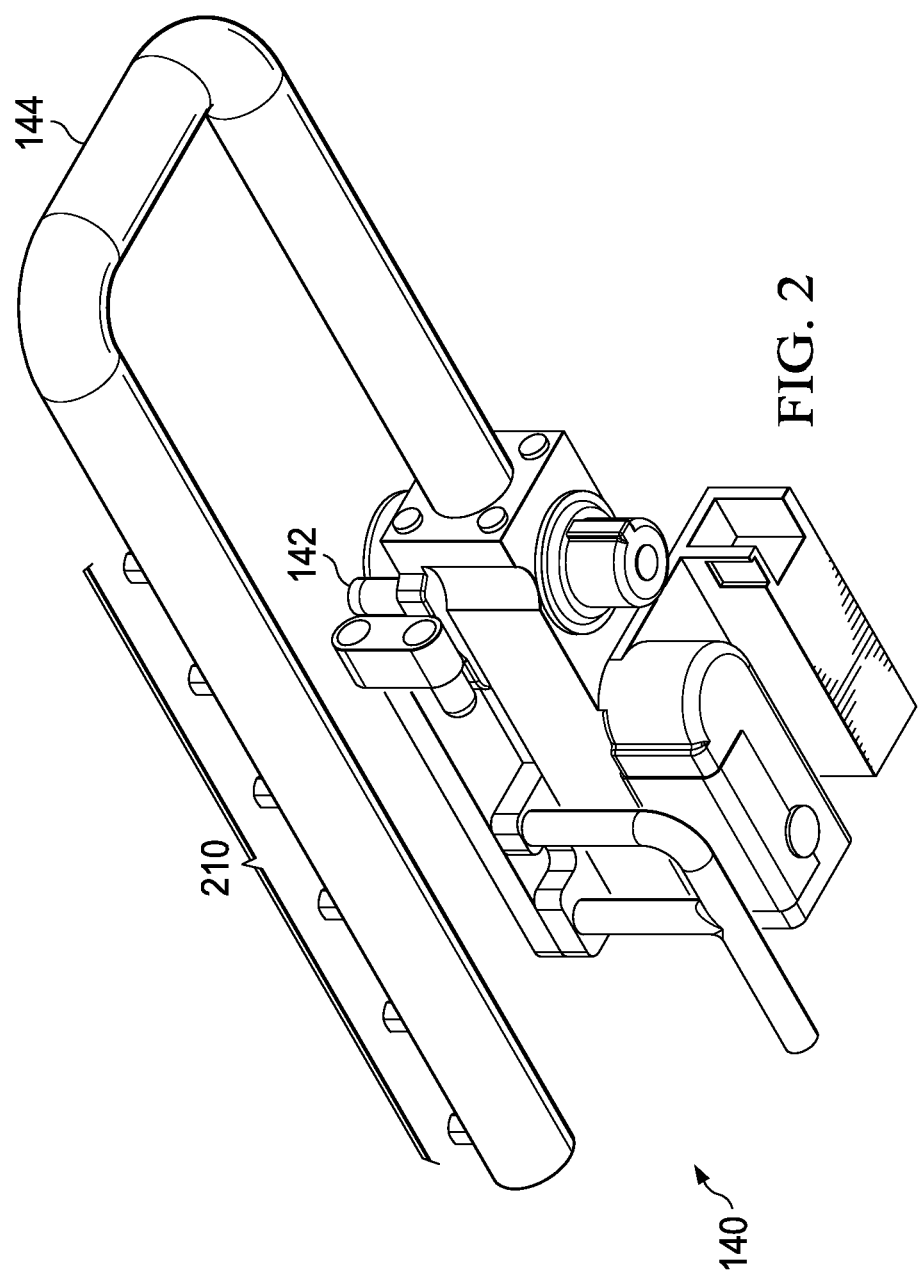
FIG. 2 is an isometric view of a portion of one embodiment of a burner assembly of the furnace of FIG. 1.

FIG. 2 is an isometric view of a portion of one embodiment of the burner assembly 140. Illustrated are the valve 142 and the manifold 144, which takes the form of a pipe 144.

A plurality of gas orifices 210 are coupled to the manifold 144. In the illustrated embodiment, the plurality of gas orifices 210 are coupled to the manifold 144 along a portion of its length. Also in the illustrated embodiment, the plurality of gas orifices 210 are coupled to the manifold 144 such that they are generally linearly aligned, generally oriented in the same direction and spaced-apart by generally equal amounts. In various alternative embodiments, the plurality of gas orifices 210 are coupled to the manifold in other arrangements.

In the illustrated embodiment, the plurality of gas orifices 210 have threads (not shown in FIG. 2) on an outer surface thereof configured to engage corresponding threads (not shown) on an inner surface of bores (also not shown) in the manifold 144. Threads are one specific embodiment of a structure configured to allow one or more of the plurality of gas orifices 210 to be removed from the manifold 144 and replaced as necessary, including with gas orifices that correctly correspond to the type of gaseous fuel that the furnace is to use in its operation. In alternative embodiments, one or more of the plurality of gas orifices 210 have alternative conventional or later-developed structures that render them removable and replaceable, including positive engagement structures such as bayonets and frictional engagement structures, such as friction fittings.

In various embodiments, the plurality of orifices 210 may be removed and replaced as a group, perhaps by providing a structure to couple the plurality of orifices 210 together or by removing and replacing all or a portion of the manifold 144. In the latter embodiment, the plurality of orifices 210 typically remain attached to the manifold 144, and perhaps are integral with the manifold.

FIGS. 3A-C are respective side, right-end and cross-section elevational views of one embodiment of one of the plurality of gas orifices 210 of FIG. 2. The gas orifice 210 is in the general configuration of a common bolt.

Referring specifically to FIG. 3A, the gas orifice 210 has a body 310 having a central axis denoted by a broken line extending along a length of the body 310. The illustrated embodiment of the body 310 has a faceted (e.g., hexagonal) head 320 configured to facilitate its removal or replacement by a standard wrench. In alternative embodiments, the head 320 has alternative conventional or proprietary configurations by which a conventional or proprietary tool can engage the body 310 to remove or replace the gas orifice 210.

The illustrated embodiment of the body 300 also has a beveled end 330 proximate which are threads 340. The beveled end 330 facilitates insertion into an correspondingly threaded body, such as the manifold 144 of FIGS. 1 and 2. As described above, the threads 340 are configured to allow the body 300 to be inserted and removed into the correspondingly threaded body.

Referring specifically to FIG. 3B, an aperture 350 extends through the body 310 along the central axis. Referring now to FIG. 3C, one embodiment of an internal configuration of the aperture 350 will now be described. In the embodiment of FIG. 3C, the gas flows from left to right. A conical inlet 360 of angle θ permits gas (e.g., a gaseous alternative fuel) delivered to the gas orifice 210 to enter the body 310 thereof. Upon passing through the conical inlet 360, the gas then encounters a metering neck 370. The metering neck 370 has a cross-sectional area such that a given flow rate of the gas is established when the gas is delivered to the gas orifice 210 at a given delivery pressure. In the embodiment of FIG. 3C, the neck 370 is circular in cross-section and has a diameter $D_1$.

Conventional orifices are concerned only with metering the flow of gas and therefore contain only the metering neck 370. (Those skilled in the pertinent art are familiar with conventional gas orifices; for that reason, they will not be further illustrated or described herein.) It has been found, however, that merely metering the gas flow and failing otherwise to process it results in a temperature profile that depends upon the type of gas being used. As described above, it is desirable to provide a gas orifice for an alternative fuel that produces a temperature profile that differs from that which a conventional orifice would produce. In one embodiment, that temperature profile is substantially like one produced by a conventional orifice for a principal fuel. In one quite specific embodiment, it is desirable to provide a novel propane orifice that produces a temperature profile substantially like that produced by a conventional natural gas orifice and further to provide substantially similar temperature profiles at the respective standard delivery pressures for propane and natural gas.

Accordingly, upon passing through the metering neck 370, the gas then encounters a diffuser 380. The diffuser 380 has a cross-sectional area that is larger than the cross-sectional area of the metering neck 370 such that the velocity of the gas decreases. The diffuser 380 has a length L that is sufficient to allow the gas to achieve a substantially laminar flow before it exits the diffuser. In the illustrated embodiment, a laminar flow is advantageous to avoid entraining excess air in the gas after the gas exits the gas orifice 210. In the embodiment of FIG. 3C, the diffuser 380 is circular in cross-section and has a diameter $D_2$.

In various embodiments, $D_2$ lies in the range of about 1.1 to about 1.7 times $D_1$. However, those skilled in the pertinent should understand that the desired flow rate determines the cross-sectional area of the metering neck 370 and the desired temperature profile determines the cross-sectional area of the diffuser 380. Thus, the ratio $D_2/D_1$ may lie outside this range.

In various embodiments, L lies in the range of about 3 to about 7 times $D_2$. However, those skilled in the pertinent should understand that the achievement of a substantially laminar flow determines the magnitude of L. Thus, L may lie outside this range.

In one specific embodiment, $D_1$=0.0360", $D_2$=0.0453" and L=0.2265", which equals five times $D_2$. These dimensions have been found to yield a propane orifice that, at a standard propane delivery pressure of 10" WC (water column), provides a temperature profile in the heat exchangers of the heat exchanger assembly 120 of FIG. 1 that is substantially similar to the temperature profile produced by a conventional natural gas orifice at a standard natural gas delivery pressure of 7" WC in those same heat exchangers. In the illustrated embodiment, θ=40°, but this angle may vary.

FIG. 4 is a flow diagram of one embodiment of a method of designing a gas orifice carried out according to the principles of the invention. The method begins in a start step 410. In a step 420, at least one principal-fuel gas orifice is manufactured having a metering neck of a desired cross sectional area. In a step 430, a temperature profile is determined assuming a principal fuel delivered to a gas orifice at a standard delivery pressure for the principal fuel. In a step 440, a cross-sectional area of a metering neck for an alternative-fuel gas orifice is determined assuming a standard delivery pressure for the alternative fuel. In a step 450, a cross-sectional area and a length of a diffuser are determined based on the temperature profile that results from an alternative fuel delivered to the orifice at a standard delivery pressure for the alternative fuel. A broken line in FIG. 4 indicates that the step 450 may be repeated with multiple candidate gas orifices having different diffuser cross-sectional areas and/or lengths are made and tested before the appropriate cross-sectional area and length are determined. In a step 460, at least one alternative-fuel gas orifice is manufactured having a metering neck of the desired cross-sectional area and diffuser of the desired cross-sectional area and length. The method ends in a step 470.

Those skilled in the art to which this application relates will appreciate that other and further additions, deletions, substitutions and modifications may be made to the described embodiments.

What is claimed is:

1. A gas furnace, comprising:
   a housing;
   a solenoid valve located in said housing;
   a manifold coupled to said solenoid valve;
   at least one alternative-fuel gas orifice coupled to said manifold, said at least one alternative-fuel gas orifice having a body having a first portion, a second portion adjacent said first portion, an aperture extending therethrough, wherein said first portion comprises a beveled end and threads, and said second portion comprises a head configured for turning said body, said body including:

a metering neck having an entry diameter D1 and a cross-sectional area such that a given flow rate of an alternative-fuel gas is established when said alternative-fuel gas is delivered to said alternative-fuel gas orifice at a given alternative-fuel delivery pressure;

a diffuser having a cross-sectional area larger than said cross-sectional area of said metering neck and a length such that said alternative-fuel gas achieves a substantially laminar flow before exiting said diffuser through an exit aperture having diameter D2, wherein a ratio D2/D1 is greater than 1.0 and D2 is within said second portion;

wherein a diameter of said diffuser is between 1.1 and 1.7 times a diameter of said metering neck;

at least one corresponding heat exchanger configured for operation with a principal-fuel gas temperature profile located proximate said at least one alternative-fuel gas orifice, wherein a cross-sectional area of the diffuser causes the alternative-fuel gas to burn in the at least one heat exchanger with a resultant temperature profile that is the same as the principal-fuel gas temperature profile in the heat exchanger at a standard principal-fuel delivery pressure; and a blower located in said housing proximate said at least one heat exchanger.

2. The gas furnace as recited in claim 1, further comprising a draft inducing exhaust fan associated with said at least one heat exchanger.

3. The gas furnace as recited in claim 1, wherein said metering neck has a circular cross-section.

4. The gas furnace as recited in claim 1, wherein said diffuser has a circular cross section.

5. The gas furnace as recited in claim 1, wherein said length is between 3 and 7 times a diameter of said diffuser.

6. The gas furnace as recited in claim 1, wherein a diameter of said metering neck is between 0.02 inches and 0.05 inches and said length is about 5 times a diameter of said diffuser.

* * * * *